United States Patent [19]

Copeland

[11] Patent Number: 4,471,553
[45] Date of Patent: Sep. 18, 1984

[54] SPRING LOADED FISHING ROD HOLDER

[76] Inventor: Darrell L. Copeland, 6001 Pleasant Hill Ct., Arlington, Tex. 76016

[21] Appl. No.: 393,682

[22] Filed: Jun. 30, 1982

[51] Int. Cl.³ ............................................. A01K 97/10
[52] U.S. Cl. ........................................................ 43/15
[58] Field of Search ..................... 43/15, 16, 17, 43.12

[56] References Cited

U.S. PATENT DOCUMENTS

| | | | |
|---|---|---|---|
| 693,071 | 2/1902 | Ruud | 43/15 |
| 1,957,853 | 5/1934 | Sibley | 43/15 |
| 2,642,690 | 6/1953 | Soenksen | 43/15 |
| 2,803,911 | 8/1957 | Hollingsworth | 43/15 |
| 2,810,981 | 10/1957 | Littan | 43/16 |
| 2,893,156 | 7/1959 | Warren | 43/17 |
| 3,699,701 | 10/1972 | Jacobs | 43/15 |
| 3,867,779 | 2/1975 | McMaster | 43/15 |
| 3,943,650 | 3/1976 | Johansson et al. | 43/15 |
| 3,977,117 | 8/1976 | Zahner | 43/15 |
| 3,979,852 | 9/1976 | Johnson | 43/16 |
| 4,031,651 | 6/1977 | Titze | 43/15 |

FOREIGN PATENT DOCUMENTS 2263108   5/1974   Fed. Rep. of Germany .......... 43/15

Primary Examiner—Gene P. Crosby
Attorney, Agent, or Firm—Hubbard, Thurman, Turner & Tucker

[57] ABSTRACT

A fishing rod holder features an automatic hook setting mechanism which is adjustable over a wide range thereby making it suitable for use with both heavy and light tackle, and for stationary use or trolling. The fishing rod holder includes an elongated rod retainer which is pivotally coupled to a support member such as a ground engaging stake or the sidewall of a boat. The fishing rod is inserted into a cup which is pivotally mounted onto a pedestal. A latch plate is set in detented engagement with a pivotally mounted backplate. A trigger is carried by the latch plate and engages the backplate. The trigger is actuated by rotation of a trip bar which is pivotally mounted onto the latch plate. The fishing line is run around a retainer carried by the trip bar. The pulling force developed by a strike causes rotation of the trip bar and actuation of the trigger. The strike force required to actuate the trigger is adjusted by changing the location of the line retainer on the trip bar. Strike sensitivity is increased by moving the retainer to a position near the upper end of the trip bar, and is decreased by moving the retainer closer to the trigger.

2 Claims, 3 Drawing Figures

SPRING LOADED FISHING ROD HOLDER

BACKGROUND OF THE INVENTION

1. Field of the Invention

The present invention relates to fishing rod holders of the type including an automatic hook setting mechanism.

2. Description of the Prior Art

Fishing rod holders which include automatic hook setting devices are known for use from the bank of a river, stream or pond, or for ice fishing, or for use from the side of a boat or barge. The majority of such arrangements usually include a holder for the fishing rod, a spring of some type and a triggering mechanism which releases the spring to lift the fishing rod and thereby set the hook. The various improvements which have been proposed for the spring loaded rod holder have been concerned with improving the cocking mechanism, means for tripping the latching mechanism, and means for reliably maintaining the rod holder in a cocked position without being affected by variations in rod weight or by loading induced by wave action or by the wind. Generally, other improvements have been related to the portability of the assembly, the ease of setting it up and cocking it, and the adjustment of its sensitivity whereby it can be used with relatively heavy tackle or light tackle, and for stationary fishing or for trolling.

OBJECTS OF THE INVENTION

It is, therefore, the principal object of the present invention to provide an improved fishing rod holder having an automatic hook setting mechanism which is adaptable for use with relatively heavy tackle as well as light tackle.

A related object of the invention is to provide a fishing rod holder having an automatic fish hook setting mechanism which can be adjusted over a wide tripping force range so that, depending upon its adjustment, it will be responsive to relatively light strikes, as in crappie fishing or ice fishing, or responsive only to relatively heavy strikes, as for example, when trolling or for relatively large game fish such as striped bass.

SUMMARY OF THE INVENTION

The fishing rod holder of the present invention includes an automatic hook setting mechanism which is adjustable over a wide range making it suitable for use with both heavy and light tackle, and for stationary or trolling use. The fishing rod holder includes an elongated rod retainer which is pivotally coupled to a support member, such as a ground engaging stake, or the sidewall of a boat. The fishing rod is carried in a generally cylindrical retainer having a cup which receives the butt of the fishing rod. The cylindrical retainer is mounted onto a latch plate which is pivotally coupled to a pedestal plate. The latch plate is set in detented engagement with a backplate which is also pivotally mounted onto the pedestal plate. A trigger is carried by the latch plate and engages the backplate.

When the latch plate is set, the latch plate, pedestal plate and back plate form a generally triangular configuration. The trigger includes a trip bar extension which is pivotally mounted onto the latch plate. The trigger is actuated by rotation of the trip bar in response to the pulling force developed by the fishing line. The fishing line is run around a retainer carried by the trip bar. The pulling force developed by a strike causes rotation of the trip bar and actuation of the trigger. The trigger moves the back plate and latch plate out of detented engagement, thereby allowing the spring to pull the latch plate and rod holder downwardly onto the pedestal plate. As the latch plate and rod holder rotate downwardly, the rod is rotated upwardly, and the hook is set.

The strike force required to actuate the trigger is adjusted by changing the location of the retainer on the trip bar. Strike sensitivity is increased by moving the retainer to a position near the upper end of the trip bar, and is decreased by moving the retainer closer to the trigger. Because of the mechanical advantage provided by the trip bar, the triggering force can be adjusted over a wide range, thereby making the assembly compatible with both light and heavy tackle, and for both stationary and trolling operations, and for accommodating the strike behaviour of a particular type of game fish.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

DETAILED DESCRIPTION OF THE PREFERRED EMBODIMENTS

Figure 1:
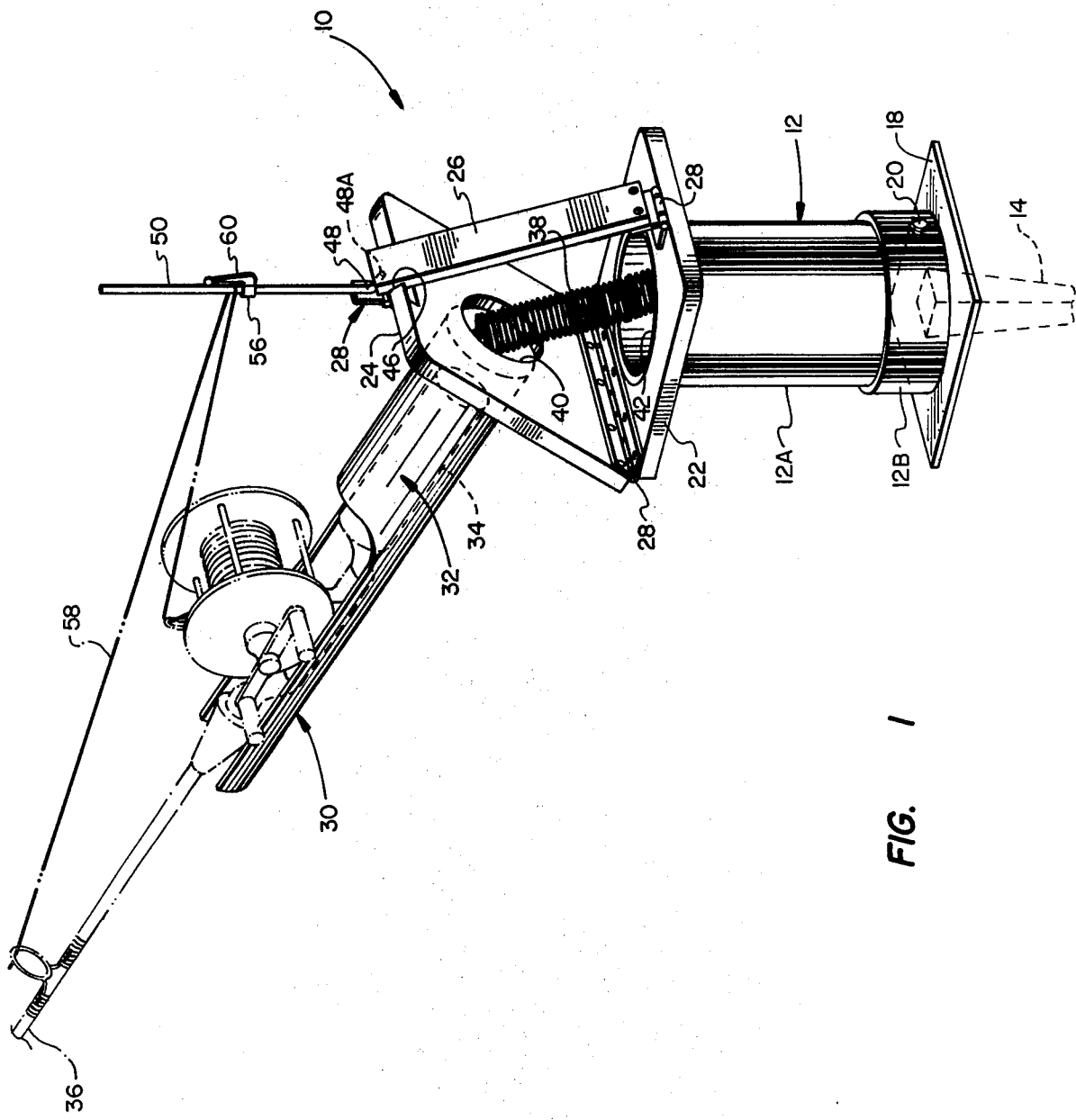
FIG. 1 is a perspective view of a fishing rod holder having an automatic hook setting mechanism.

In the description which follows, like parts are marked throughout the specification and drawings with the same reference numerals, respectively. The drawings are not necessarily to scale and in some instances proportions have been exaggerated in order to more clearly depict certain features of the invention.

Referring now to FIG. 1, a fishing rod holder and automatic hook setting assembly 10 is mounted on an upright support post 12 which includes a tapered end 14 for penetrating the ground 16 adjacent a lake, river or other body of water. It should be understood that the rod holder and automatic hook setting mechanism of the invention can be used equally well when attached to the side of a boat. Operation of the assembly when attached to a boat will generally become apparent from the following explanation of the ground based, stationary fishing assembly 10, and specific differences, if any, will be indicated.

The support post 12 is provided with a base plate 18 for driving the tapered end 14 into the ground 16 by applying foot pressure. The base plate 18 also serves to stabilize the assembly in an upright position. The support post 12 is preferably made of a heavy guage, galvanized steel. However, other materials such as wood or plastic may be used to good advantage.

Figure 2:
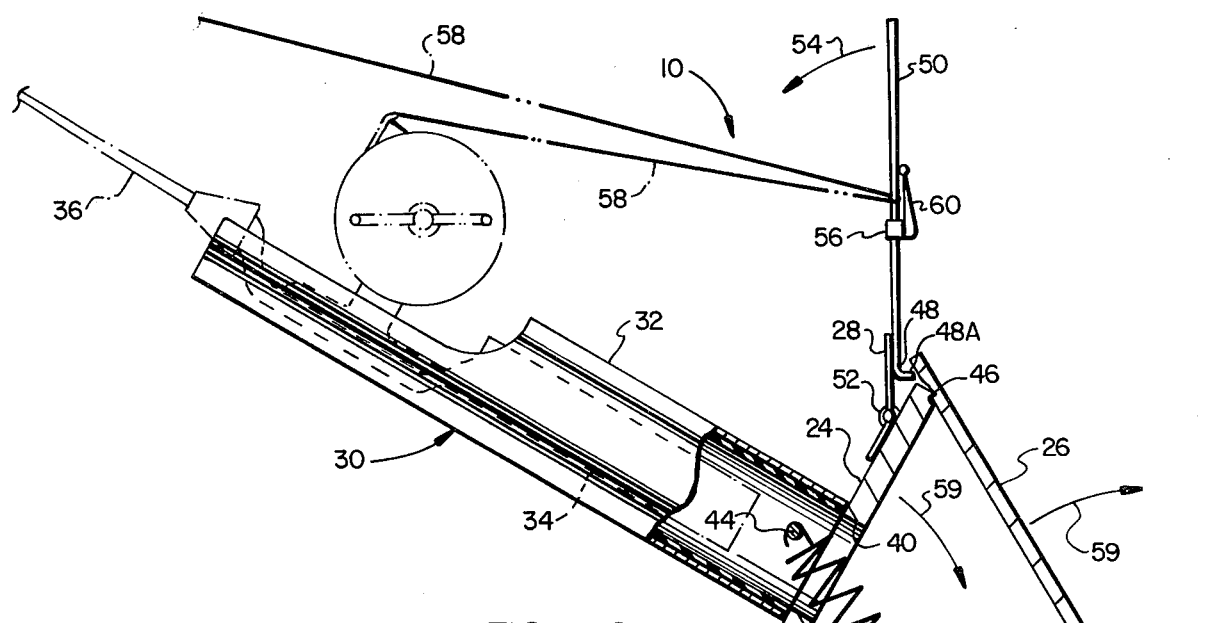
FIG. 2 is a left side elevation view of the fishing rod holder of FIG. 1 in the cocked position; and, FIG. 3 is a left side elevation view similar to FIG. 2 which illustrates the released position of the fishing rod holder assembly.

The operating elevation of the rod holder assembly 10 is adjustable as can best be seen in FIG. 2. According to this arrangement, the upper half of the rod holder assembly 10 is coupled to the support post 12 by a tubular telescoping arrangement in which the support post 12 comprises an inner member 12A and an outer member 12B. The position of the inner member 12A is fixed by means of a set screw 20. By this arrangement, the elevation of the upper half of the rod holder assembly is adjustable with respect to ground level, as indicated by the arrow 21.

Referring now to FIG. 2, the rod holder and latching mechanism is movably coupled to the support post 12 by a pedestal plate 22, a forward latch plate 24 and a back latch plate 26. The pedestal plate 22 is firmly secured to the inner tubular member 12A of the support post 12. The latch plate 24 and backplate 26 are each pivotally mounted onto opposite sides of the pedestal plate 22 by means of hinges 28. When the assembly is in its cocked position, as illustrated in FIG. 2, the pedestal plate 22, latch plate 24 and back plate 26 appear in a triangular orientation.

A rod retainer cylinder 30 is attached to the latch plate 24 and extends outwardly at a right angle with respect thereto. The lower end of the rod retainer cylinder 30 forms a cup 32 in which the handle 34 of a fishing rod is received. When placed in the cocked position as shown in FIG. 2, the rod retainer cylinder 30 and the fishing rod 36 extend outwardly and are elevated in pitch with respect to horizontal.

The latch plate 24 is further coupled to the pedestal plate 22 and support post 12 by a tension spring 38. Preferably, the latch plate 24 includes a circular cut-out opening 40 and the pedestal plate 22 has a circular cut-out opening 42 through which the opposite ends of the tension spring 38 are extended, with one end of the spring 38 being anchored to the rod retainer cylinder 30 by means of an anchor pin 44, and the lower end of the tension spring 38 being anchored to the innermost support tube member 12A by an anchor pin 44.

According to an important feature of the invention, the latch plate 24 is received in detented engagement with the back plate 26 when the assembly is set in its cocked position as illustrated in FIGS. 1 and 2. The back plate 26 is provided with a groove 46 in which the edge of the latch plate 24 is received. The groove 46 and the edge of the latch plate 24 both form a right angle in cross-section. Thus, the latch plate 24 is received in positive engagement with the back plate 26, and is maintained in the cocked position by the pulling force developed by the tension spring 38.

As illustrated in FIGS. 1 and 2, the rod holder assembly 10 is in its cocked position, and the tension spring 38 is maintained under tension, ready to snap the latch plate 24 downwardly in response to release of detented engagement between the latch plate 24 and the back plate 26. This release is provided by a trigger 48 which is pivotally coupled to the latch plate 24. The trigger 48 includes an elongated trip bar 50 which projects upwardly above the latch plate 24. The trigger 48 includes a tang portion 48A which is held in positive engagement with the back plate 26 by a bias spring 52.

The bias spring 52 is coupled between the movable arms of a hinge 28, the lower arm being anchored to the latch plate 24, and the upper arm being anchored to the trip bar 50. According to this arrangement, the bias spring 52 develops a torque which maintains the trigger tang portion 48A in yieldable engagement with the back plate 26. Because of the force exerted by the bias spring 58, the trigger tang 48A and trip bar 50 are biased for movement in a clockwise direction, and the assembly is in static balance as long as positive engagement is maintained between the latching surface of the latch plate 24 and the back plate groove 46.

According to an important feature of the invention, the latch is tripped by counterclockwise rotation of the trip bar 50, as indicated by the arrow 54, in response to a strike. The force developed by a strike is coupled to the trip bar 50 by a line retainer clip 56. In this arrangement, the fishing line 58 is threaded through the line retainer clip 56 so that tension force developed in the fishing line 58 is reacted by the trip bar 50. The force level required to trip the latch must be great enough to overcome the bias force developed by the spring 52 and to overcome the frictional forces of engagement between the latch plate 24 and the back plate 26.

Figure 3:
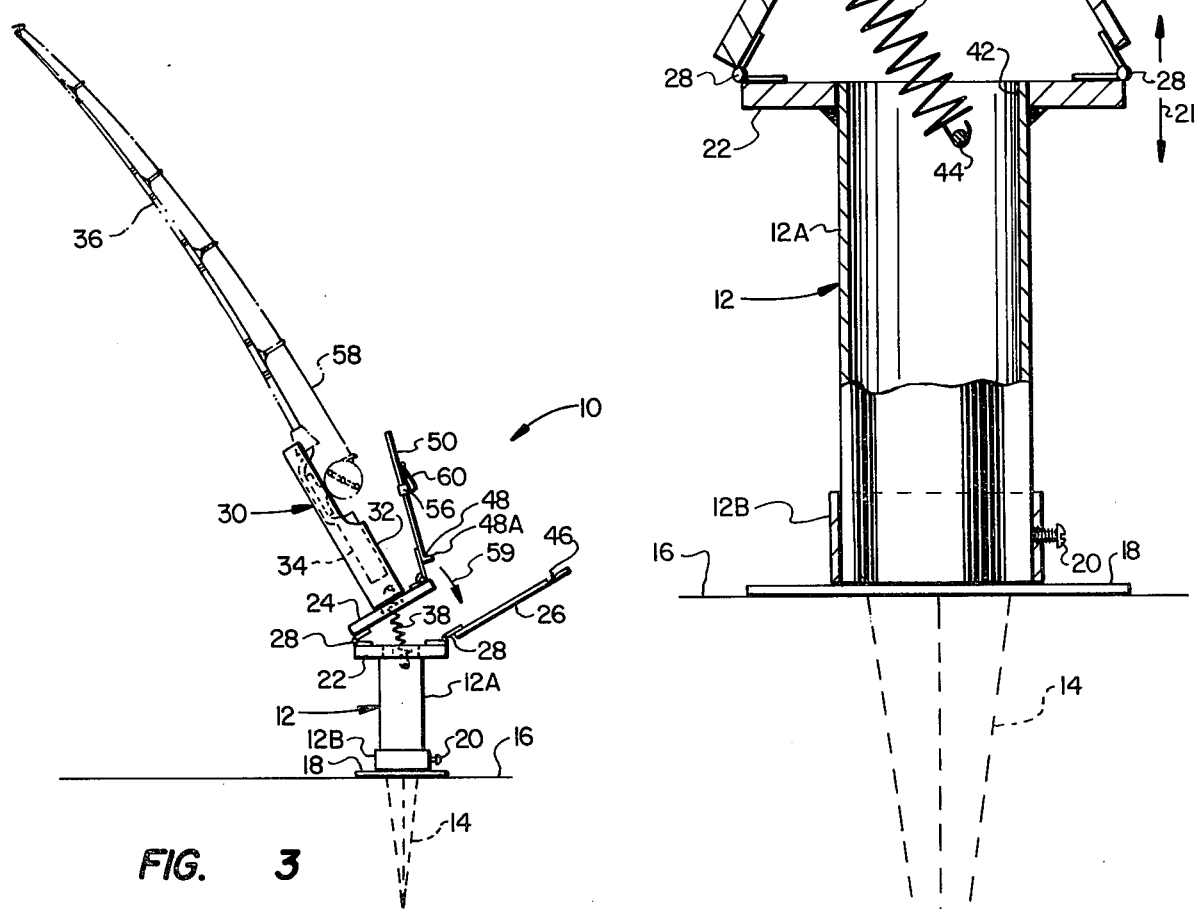

The threshold force level can be decreased by moving the position of the line retainer 56 along the trip bar 50 and away from the trigger. The threshold force level is increased by moving the line retainer clip 56 toward the trigger. Movement of the line retainer 56 changes the effective moment arm, thereby altering the force level required to rotate the trigger sufficiently to disengage the latch plate 24 and back plate 26. When this occurs, the latch plate 24 is pulled downwardly with great force by the tension spring 38, as indicated by the arrow 59. The trip bar 50, which is biased by the spring 52, remains in a substantially upright position relative to the latch plate 24, as the bias spring 28 yields slightly in response to the strike force. As the strike force increases, the fishing line 58 is pulled out of the retainer clip 60 and over the end of the trip bar 50 (FIG. 3).

It will be appreciated that the weight of the fishing rod, whether it be light tackle or heavy tackle, and a predetermined amount of natural loading caused by wind or wave action, can be compensated for merely by changing the position of the retainer clip 56. Preferably, the line retainer clip 56 is slidably coupled to the trip bar 50, so that the position of the line retainer 56 can be quickly and easily adjusted. Moreover, the line retainer clip 56 has a resilient arm 60 which can be released or partially disengaged with respect to the line retainer 56 so that the fishing line 58 can be quickly and easily released from or confined around the trip bar 50. The resilient arm portion 60 forms a eyelet in which the fishing line is releasably confined.

To operate the fishing rod holder 10, the assembly is set into the ground 16 at a convenient place adjoining a river, lake or other body of water. The rod retainer cylinder 30 is then rotated upwardly to a position slightly elevated above the horizontal, and the latch plate 24 is rotated upwardly until there is positive, detented engagement within the latching groove 46 of the back plate 26. The line retainer 56 is then manually moved to an appropriate position along the trip bar 50.

After the assembly has been cocked, and the line retainer 56 has been set, the bait is cast and the reel drag is locked. Then the fishing rod 36 is placed with its handle 34 inside the cup 32 and the line 58 is looped around the trip bar and is slipped under the resilient retainer clip arm 60. Thereafter, the rod holder assembly 10 can be left unattended, as desired.

It response to a strike, the tip of the forward end of the rod 36 will be pulled downwardly, thereby causing rotation of the trip bar 50 in a counterclockwise direction. As this occurs, the trigger tang 48A causes the back plate 26 to lift away from the latch plate 24, thereby allowing the latch plate 24 to be pulled downwardly with great force by the tension spring 38. When this occurs, the latch plate 24 rotates clockwise until it strikes the pedestal plate 22. The back plate 26 is moved in a clockwise direction as indicated by the arrow 59 away from the latch plate 24. At the same time, tension is maintained in the fishing line 58 by the bias force developed in the spring 52, which tends to restore the trip bar 50 to its upright position. The sudden release of the latch plate 24 causes a strong setting force to be transmitted through the forward end of the fishing rod through the fishing line so that the hook will be firmly set. Moreover, the rod retainer cylinder 30 remains substantially elevated above its cocked position, thereby signalling that a strike has occured.

It will be appreciated from the foregoing description that the fishing rod holder assembly 10 is easy to construct and set up, and can be easily knocked down and folded with partial disassembly for convenient handling or shipment. Moreover, it can be operated from a boat or other floating structure.

Although a preferred embodiment of the invention has been described in detail, it should be understood that various changes, substitutions and alterations can be made therein without departing from the spirit and scope of the invention as defined by the appended claims.

What is claimed is:

1. An automatic hook setting device comprising, in combination:
   a support member including a pedestal plate;
   a fishing rod retainer including a first latch plate, said first latch plate being pivotally mounted onto said pedestal plate;
   a spring coupled between said support member and said rod retainer for biasing said rod retainer for rotational movement toward the support member;
   a second latch plate pivotally mounted on said pedestal plate for movement from a cocked position in which it is disposed in latched engagement with said first latch plate and wherein said spring is maintained in tension, to a tripped position wherein said first and second latch plates are disengaged and said spring tension is relieved;
   a trip arm pivotally coupled to said first latch plate, said trip arm having a trigger portion engagable with said second latch plate in the cocked position and movable against said second latch plate for releasing it from detented engagement with said first latch plate in response to movement of said trip arm; and,
   a retainer movably coupled to said trip arm for guiding fishing line around said trip arm.

2. An automatic hook setting device comprising, in combination:
   a support member;
   a fishing rod retainer pivotally mounted on said support member;
   a spring coupled between said support member and said rod retainer for biasing said rod retainer for rotational movement toward the support member;
   a latch plate pivotally mounted on said support member for movement from a cocked position in which it is disposed in latched engagement with said fishing rod retainer and wherein said spring is maintained in tension, to a tripped position wherein said latch is disengaged from said rod retainer and said spring tension is relieved;
   a trip arm pivotally coupled to said rod retainer, said trip arm having a trigger portion engagable with said latch plate in the cocked position and movable against said latch plate for releasing it from detented engagement with said rod retainer in response to movement of said trip arm; and,
   a retainer slidably coupled to said trip arm for guiding fishing line around said trip arm, said retainer including a resilient clip arm which forms a releasable eyelet in combination with said trip arm.

* * * * *